United States Patent [19]

Schilling et al.

[11] Patent Number: 4,648,493
[45] Date of Patent: Mar. 10, 1987

[54] ROTATIONAL CONTROL APPARATUS

[75] Inventors: Hugh K. Schilling, St. Paul; Leonid Dayen, Plymouth; Charles D. Raines, Blaine, all of Minn.

[73] Assignee: Horton Manufacturing Co., Inc., Minneapolis, Minn.

[21] Appl. No.: 806,662

[22] Filed: Dec. 9, 1985

[51] Int. Cl.[4] .............. F16D 67/04; F16D 25/08; F16D 25/10

[52] U.S. Cl. ................. 192/18 A; 192/48.91; 192/85 C; 192/86; 192/87.19; 192/113 B

[58] Field of Search ............. 192/18 A, 86, 87.14, 192/87.18, 113 B, 12 C, 48.91, 87.19, 87.17, 85 C

[56] References Cited

U.S. PATENT DOCUMENTS

| 843,076 | 2/1907 | Detrick | 192/86 X |
|---|---|---|---|
| 976,224 | 11/1910 | St. Clair | |
| 2,386,512 | 10/1945 | Smith | 192/85 C X |
| 3,163,092 | 12/1964 | Masser | 92/94 |
| 3,309,149 | 3/1967 | Bueler | 303/13 |
| 3,347,600 | 10/1967 | Fites | 303/71 |
| 3,450,005 | 6/1969 | Ellis | 91/189 |
| 3,580,369 | 5/1971 | Heck | 192/113 B X |
| 3,595,353 | 7/1971 | Beneke | 192/87.17 X |
| 3,638,773 | 2/1972 | Lewis et al. | 192/18 A |
| 3,653,477 | 4/1972 | Hansen | 192/113 B |
| 3,680,666 | 8/1972 | Sommer | 192/86 X |
| 3,710,902 | 1/1973 | Hansen | 192/18 A |
| 3,724,609 | 4/1973 | Kobald | 188/170 |
| 3,805,632 | 4/1974 | Prokop et al. | 192/87.17 X |
| 3,818,804 | 6/1974 | Miller | 92/23 |
| 3,924,715 | 12/1975 | Cory | 192/18 A |
| 3,954,304 | 5/1976 | Engle | 303/13 |
| 3,986,584 | 10/1976 | Wright et al. | 188/71.8 |
| 4,036,533 | 7/1977 | Kraft | 303/6 A |
| 4,077,500 | 3/1978 | Hickmann et al. | 188/106 P |
| 4,184,573 | 1/1980 | Bricker et al. | 188/170 |
| 4,187,931 | 2/1980 | Balzer | 188/72.1 |
| 4,361,078 | 11/1982 | Cape et al. | 92/31 |
| 4,509,627 | 4/1985 | Kawamoto | 192/86 X |
| 4,534,454 | 8/1985 | Brooks | 192/18 A |
| 4,549,639 | 10/1985 | Hansen | 192/87.17 X |
| 4,560,034 | 12/1985 | Windish et al. | 188/72.3 |

OTHER PUBLICATIONS

Assembly Drawing of Horton Manufacturing Co., Inc.; dated Mar. 12, 1979.

Primary Examiner—Rodney H. Bonck
Attorney, Agent, or Firm—Peterson, Wicks, Nemer & Kamrath

[57] ABSTRACT

A rotational control apparatus is shown in its most preferred form according to the teachings of the present invention as a combination clutch/brake. The clutch/brake includes an interfacing member formed by first and second pressure plates rotatably mounted but reciprocally related with respect to each other. The interfacing member is reciprocated between one of first and second disk packs by an actuating rod reciprocally mounted in the housing and interconnected to ears formed on the second pressure plate. The actuating rods are reciprocated by actuation canisters located on opposite ends thereof. Each of the actuation canisters includes a piston which is reciprocated by a fluid chamber and a spring located in the fluid chamber. In the first preferred form, the springs of the canisters have a compressional force which are equal and less than required to actuate the clutch/brake such that in the absence of fluid pressure, the actuating rod and interfacing member is in a normal, neutral condition. In another preferred form, the spring of one of the canisters has a compressional force sufficient to actuate the clutch/brake in a normal set condition. Fluid pressure may be electively introduced into the fluid chamber to assist the actuation force spring to return the piston to its set condition and at greater actuation forces.

20 Claims, 3 Drawing Figures

ROTATIONAL CONTROL APPARATUS

BACKGROUND

The present invention relates generally to rotational control apparatus, particularly to apparatus for providing rotational control between a first member, a second member, and a third member, specifically to combination clutch/brakes, and more specifically to improved combination clutch/brakes.

It is often desirable to rotationally control first, second, and third members with respect to each other such as driving or braking an output as in a combination clutch/brake. Although apparatuses providing such desired rotational control exist, a need has arisen for such rotational control apparatus having improved constructional and operating characteristics.

SUMMARY

The present invention solves this and other needs and problems in rotational control apparatus by providing, in a preferred form of the present invention, an improved rotational interfacing member having first and second pressure plates which are rotatably mounted but reciprocally related to each other. The improved rotational interfacing member is reciprocated between a first condition where the first pressure plate interfaces with one of a first or second interfacing elements and a second condition where the second pressure plate interfaces with the other of the first or second interfacing elements.

Further, the present invention solves this and other needs and problems in rotational control apparatus by providing in another preferred form of the present invention, an improved apparatus actuation portion having an actuating rod interconnected to the rotational interfacing member and reciprocally mounted in the apparatus. The actuating rods are reciprocated by actuation canisters removably secured to the apparatus and abutting on opposite ends of the actuating rods. The improved construction allows rapid replacement of the actuation portions and rapid conversion of the apparatus to either a normal neutral or normal set condition.

Additionally, the present invention solves this and other needs and problems in rotational control apparatus by providing in another preferred form of the present invention an improved system for actuating the apparatus into a normal set condition. Specifically, the interfacing member is biased in a set condition with a force sufficient to allow interfacing of the interfacing member with the interfacing elements to thereby actuate the apparatus. The improvement of the present invention allows this biasing force to be electively assisted by fluid pressure to set the apparatus in the normal set condition with greater actuation force.

It is thus an object of the present invention to provide a novel, improved rotational control apparatus.

It is further an object of the present invention to provide such a novel rotational control apparatus having an improved interfacing member.

It is further an object of the present invention to provide such a novel rotational control apparatus having a novel interconnection between the interfacing member and the actuating rods.

It is further an object of the present invention to provide such a novel rotational control apparatus having a factory engineered and designed normal, neutral position.

It is further an object of the present invention to provide such a novel rotational control apparatus having an improved interfacing member which may be easily and economically cast and fabricated.

It is further an object of the present invention to provide such a novel rotational control apparatus having an improved interfacing member which increases lubrication.

It is further an object of the present invention to provide such a novel rotational control apparatus having an improved interfacing member which maintains interface clearance.

It is further an object of the present invention to provide such a novel rotational control apparatus having an improved interfacing member which enhances bearing life.

It is further an object of the present invention to provide such a novel rotational control apparatus having novel, removable actuation canisters.

It is further an object of the present invention to provide such a novel rotational control apparatus having novel, removable actuation canisters allowing rapid replacement minimizing down-time.

It is further an object of the present invention to provide such a novel rotational control apparatus having novel, removable actuation canisters allowing rapid conversion from a normal, neutral or normal, set condition.

It is further an object of the present invention to provide such a novel rotational control apparatus having novel, removable actuation canisters having a modular and standardized design.

It is further an object of the present invention to provide such a novel rotational control apparatus having novel, removable actuation canisters reducing the risk of accidental release of compressed springs.

It is further an object of the present invention to provide such a novel rotational control apparatus having novel, removable actuation canisters of a simple design including relatively small number of parts incorporating all actuation functional requirements.

It is further an object of the present invention to provide such a novel rotational control apparatus allowing elective assistance to its spring set condition.

It is further an object of the present invention to provide such a novel rotational control apparatus allowing high force actuation with pistons of small size.

It is further an object of the present invention to provide such a novel rotational control apparatus allowing high force actuation with relatively low pressure fluid sources.

It is further an object of the present invention to provide such a novel rotational control apparatus allowing actuation at two distinct levels of force.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
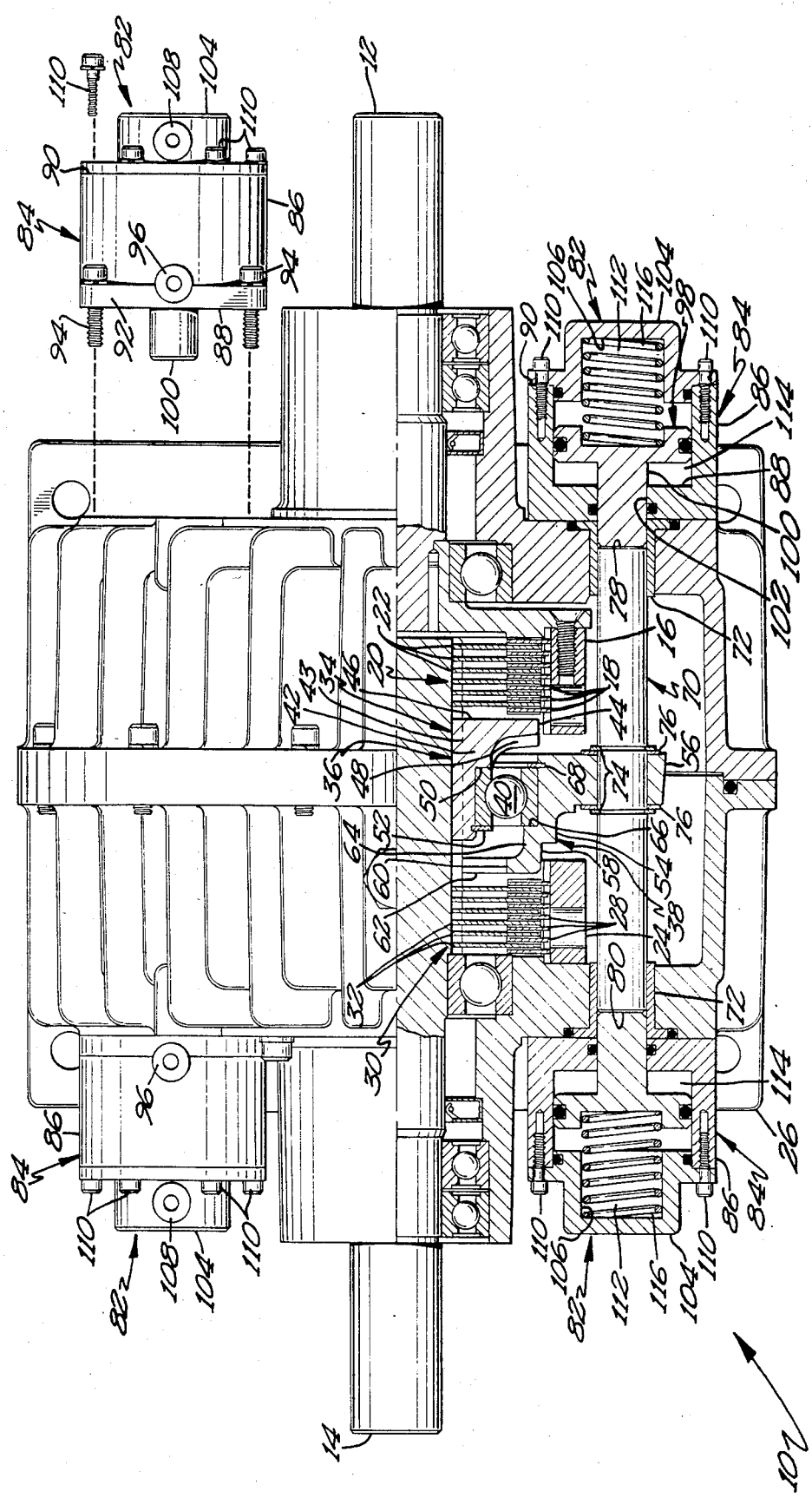
FIG. 1 shows a side view of a preferred form of a combination clutch/brake according to the teachings of the present invention with portions thereof being shown in section and with portions thereof being exploded therefrom.
Figure 3:
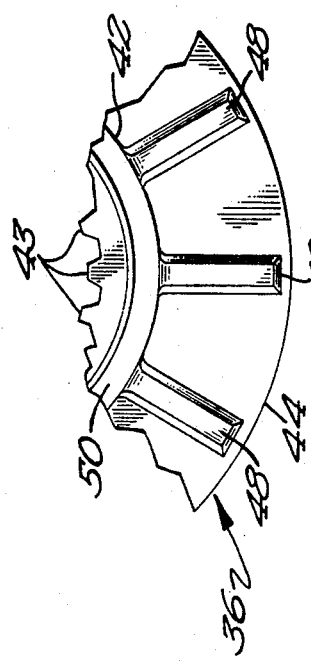
FIG. 3 shows a partial, side view of a pressure plate of the combination clutch/brake of FIGS. 1 and 2.

All Figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various Figures of the drawings, the same numerals designate the same or similar parts. Furthermore, when the terms "top", "bottom", "first", "second", "inside", "inward", "outside", and similar terms are used herein, it should be understood that these terms have reference only to the structure shown in the drawings as it would appear to a person viewing the drawings and are utilized only to facilitate describing the invention.

DESCRIPTION

A rotational control apparatus of the type of a combination clutch/brake according to the teachings of the present invention is shown in the drawings and is generally designated 10. Clutch/brake 10 generally includes a power input shaft 12 and an output shaft 14 which are rotatably mounted in housing 26 by suitable bearings such that shafts 12 and 14 and housing 26 are rotatably mounted with respect to each other. Input shaft 12 carries a first rotational interfacing element shown as a clutch spider 16 engaged with alternate disks 18 of a disk pack 20 which has intervening disks 22 keyed to output shaft 14. A second rotational interfacing element is shown as a brake spider 24 fixed to housing 26 and carrying disks 28 of a disk pack 30 which has intervening disks 32 keyed to output shaft 14. In its most preferred form, clutch/brake 10 is shown as being of the closed, oil film interface type which is particularly adaptable for use in environments such as in the food industry where it is extremely undesirable for worn interface particles to exit the apparatus, in environments where the low replacement of oil film interfaces is desirable, and/or in environments where high torque requirements of multiple interfaces is desirable. It can then be appreciated that these oil film type rotational interfacing elements of clutch/brake 10 can take other forms and constructions than the preferred form shown in the drawings. For example, disk packs 20 and 30 can take other forms of selective rotationally relating members such as but not including friction interface disks and the like.

According to the teachings of the present invention, clutch/brake 10 includes a spool-shaped interfacing member 34 located between and reciprocal to engage either disk pack 20 or 30. In the most preferred form, interfacing member 34 includes a first pressure plate 36 and a second pressure plate 38 interconnected for axial movement together and for allowing relative rotation with respect to each other by a bearing 40. Pressure plate 36 in its most preferred form is annular in shape having an L-shaped cross section and includes an axially extending cylinder 42 keyed to output shaft 14 by splines 43 and a radially extending disk 44. Disc 44 includes a first radially extending surface 46 for abutting or interfacing with disk pack 20 and a second radially extending surface having circumferentially spaced, radially extending fins 48. Bearing 40 is retained on cylinder 42 by a shoulder 50 formed integrally with disc 44 and a retaining ring 52 received in an annular cavity formed in cylinder 42.

Pressure plate 38 in its most preferred form is annular in shape having a generally L-shaped cross section and includes an axially extending cylinder 54 having first and second diametrically opposed ears 56 extending radially from the outer surface thereof. Plate 38 further includes in its most preferred form an annular element 58 having a generally L-shaped cross section. Specifically, element 58 includes a radially extending disk 60 having a first radially extending surface 62 for abutting or interfacing with disk pack 30 and an axially extending cylinder 64 having its outer surface integrally connected to the inside surface of cylinder 54. Bearing 40 is retained on cylinder 54 by shoulder 66 formed by the axial end of cylinder 64 opposite to disk 60 and by a retaining ring 68 received in an annular cavity formed in cylinder 54.

According to the teachings of the present invention, clutch/brake 10 includes first and second actuating rods 70 axially extending through ears 56 of pressure plate 38 of interfacing member 34. Actuating rods 70 are reciprocally mounted in housing 26 by bushings 72. Pressure plate 38 is fixed to actuating rods 70 by retaining rings 74 received in cavities formed in rods 70 on opposite sides of ears 56. In the most preferred form of the present invention, abutment washers 76 are provided on opposite sides of ears 56 and intermediate ears 56 and retaining rings 74. In the most preferred form, rods 70 have a length such that opposite ends 78 and 80 of rods 70 are located axially inward of bushings 72.

According to the teachings of the present invention, actuating rod 70 is operated in both directions by actuation canisters 82. Canisters 82 generally include a cup-shaped member 84 having a generally cylindrical wall 86, a generally circular, closed bottom 88, and a generally circular, open top 90. Member 84 further includes mounting flanges 92 for receiving bolts 94 threadably received in housing 26 for purposes of removably securing canisters 82 to housing 26. A fluid communication port 96 is formed in wall 86 and bottom 88 of member 84.

Actuation canisters 82 according to the teachings of the present invention further include a piston 98 having a shape and size for reciprocal receipt in wall 86 of cup-shaped member 84 and in its most preferred form is circular. An axially extending plunger rod 100 is integrally formed with piston 98 and extends through an aperture 102 formed in bottom 88 of member 84. Rod 100 has a size and shape for receipt within bushings 72 of housing 26 and for abutting with ends 78 and 80 of actuating rods 70.

Actuation canisters 82 according to the teachings of the present invention further include a closure 104 having a shape and size complementary to wall 86 of member 84 for closing open top 90 thereof. In its most preferred form, closure 104 includes an axially extending spring recess 106. A fluid communication port 108 is formed in closure 104. Closure 104 is secured to member 84 by bolts 110. Suitable sealing means is provided in canisters 82 to define a first fluid pressure chamber 112 defined between piston 98 and closure 104 and a second fluid pressure chamber 114 defined between bottom 88 of member 84 and piston 98.

According to the teachings of the present invention, actuation canisters 82 include members 116 for biasing piston 98 towards bottom 88 of member 84 shown in its preferred form as a spring in compression between piston 98 and recess 106 of closure 104. In the most preferred form, port 96 is open to the atmosphere and acts as a bleeder outlet to prevent fluid pressure chamber 114 from having a pressure differential from atmospheric. Port 108 is in fluid communication with a source of fluid pressure.

In a first preferred form of the present invention, springs 116 of canisters 82 according to the teachings of the present invention have a relatively low compressional strength generally of the range which is less than required to actuate clutch/brake 10 but which is sufficient to move rod 70 to a neutral, unactivated position. It can then be appreciated that if each rod 70 of clutch/brake 10 includes a pair of canisters 82 having neutral springs 116 abutting on opposite ends 78 and 80 of rod 70, in the absence of fluid pressure, rod 70 is located in a central position with interfacing member 34 located intermediate disk packs 20 and 30.

In another preferred form of the present invention, springs 116' of canisters 82' according to the teachings of the present invention have a compressional strength generally in the range required to actuate clutch/brake 10 and which is thus sufficient to move rod 70 to an activated position. It can then be appreciated that if each rod 70 of clutch/brake 10 includes a canister 82' having actuation springs 116' abutting on one end 78 or 80 of rod 70 and a canister 82 having a neutral spring 116 abutting on the other end 78 or 80 of rod 70, in the absence of fluid pressure, rod 70 will be biased in an actuation position with interfacing member 34 interfacing with one of disk packs 20 and 30 depending upon which end 78 or 80 canister 82' is located.

Now that the construction of clutch/brake 10 according to the teachings of the present invention has been set forth, the operation and subtle features of clutch/brake 10 can be set forth and appreciated. In operation, with rods 70 located in a centered condition, interfacing member 34 is located intermediate and in a normal, non-actuated relation with disk packs 20 and 30 due to its interconnection to rods 70 by ears 56. Then rods 70 are simultaneously axially moved by pushing ends 80 of rods 70 axially inward into housing 26 and to the right in FIG. 1, interfacing member 34 which is interconnected to rods 70 is moved axially such that surface 46 of pressure plate 36 abuts with and sandwiches disks 18 and 22 of disk pack 20 together thereby rotatably relating input shaft 12 to output shaft 14 and thereby clutching in the output to the input of clutch/brake 10. Conversely, when rods 70 are simultaneously axially moved by pushing ends 78 of rods 70 axially inward into housing 26 and to the left in FIG. 1, interfacing member 34 which is interconnected to rods 70 is moved axially such that surface 62 of pressure plate 38 abuts with and sandwiches disks 28 and 32 of disk pack 30 together thereby rotatably relating output shaft 14 to housing 26 and thereby braking the output of clutch/brake 10.

It can then be appreciated that interfacing member 34 constructed according to the teachings of the present invention is interconnected to rods 70 without allowing relative movement therebetween, such as pivotal movement. This type of interconnection between member 34 and rod 70 allows the use of retaining rings 74 and washers 76 as in the preferred form of clutch/brake 10 according to the teachings of the present invention. It can be realized that a retaining ring-type securement is relatively inexpensive compared to interconnections which allow relative movement such as pivotal, and which typically require a pin pressed through the rod to form a universal type of interconnection. Furthermore, a retaining ring-type securement according to the teachings of the present invention is extremely easier to manufacture and with closer tolerances than interconnections allowing relative movement.

Further, due to the direct interconnection of member 34 and rod 70, it is relatively easy to include a factory designed calibration for clutch/brake 10 and to position interfacing member 34 in a neutral position in clutch/brake 10 according to the teachings of the present invention than prior clutch/brakes of this construction. For example, some prior clutch/brakes included pivotal actuation of the interfacing member which required individual adjustment according to manufacturing tolerances and wear and often resulted in drag of the interfacing member with the clutch or brake disk packs in a "neutral position". With clutch/brake 10 according to the teachings of the present invention, interfacing member 34 can be engineered to be positioned between disk packs 20 and 30 when rods 70 are centered in housing 26 of clutch/brake 10.

Additionally, the particular construction of interfacing member 34 is further advantageous according to the teachings of the present invention. Particularly, pressure plates 36 and 38 can be easily and very economically cast. Specifically, pressure plates 36 and 38 do not include any internal cavities, intricate angles or portions, and like structural components which are expensive to cast or result in high rejection rates but rather pressure plates 36 and 38 are formed with easily castable shapes.

In its most preferred form, housing 26 is filled with lubricating oil according to the teachings of the present invention for lubricating and cooling the internal components of clutch/brake 10. It should then be noted when pressure plate 36 sandwiches disk pack 20 thus rotatably relating shafts 12 and 14, pressure plate 36 is rotating relative to housing 26, pressure plate 38, actuating rods 70, and like rotationally stationary parts in the preferred form described. Fins 48 which are integrally formed in pressure plate 36 rotate inside housing 26 and mistify the oil within housing 26. Therefore, the lubricating qualities of the oil are increased as a result thereof reducing wear to the internal components of clutch/brake 10. This is especially advantageous with respect to bearing 40 located closely axially adjacent to fins 48 and which allows relative rotation between pressure plates 36 and 38 when input shaft 12 is clutched in with output shaft 14.

Additionally, it should be appreciated that when output shaft 14 is stationary or in other words in the same rotational position as housing 26, pressure plates 36 and 38 do not rotate with respect to each other such that bearing 40 does not operate. Therefore, bearing 40 does not operate when clutch/brake 10 is in a neutral or brake actuation position and thus reducing bearing wear and increasing bearing life. It should be further appreciated that this non-operation of bearing 40 during the neutral and brake actuation position of clutch/brake 10 further enhances bearing life in addition to the bearing life enhancement produced by the increased lubricating effect of the oil due to its mistifying by fins 48 with pressure plate 36 of interfacing member 34.

In the first preferred form of the present invention, actuation of rods 70 is accomplished utilizing actuation canisters 82 having neutral springs 116 at both ends 78 and 80 of rods 70. If fluid pressure is introduced through port 108 into fluid pressure chamber 112 of canisters 82 having plunger rod 100 abutting with ends 78 of rods 70, rods 70 are moved to the left in FIG. 1 thus moving interfacing member 34 to sandwich disk pack 30 and braking output shaft 14 by rotationally interrelating it to housing 26. When fluid pressure is released from fluid pressure chamber 112, springs 116 of canisters 82 having plunger rod 100 abutting with ends 80 of rods 70 move rods 70 to their neutral position where springs 116 of canisters 82 on opposite ends 78 and 80 of rod 70 balance each other out. Likewise, if fluid pressure is introduced through port 108 into fluid pressure chamber 112 of canisters 82 having plunger rod 100 abutting with ends 80 of rods 70, rods 70 are moved to the right in FIG. 1 thus moving interfacing member 34 to sandwich disk pack 20 and clutching in output shaft 14 by rotationally interrelating it to input shaft 12. When fluid pressure is released from fluid pressure chamber 112, springs 116 of canisters 82 having plunger rod 100 abutting with ends 78 of rods 70 move rods 70 to their neutral position where springs 116 of canisters 82 on opposite ends 78 and 80 of rod 70 balance each other out.

In the other preferred form of the present invention, actuation of rods 70 is spring set and is accomplished utilizing actuation canister 82' having actuation springs 116' abutting with one of ends 78 and 80 of rods 70 and having actuation canister 82 having neutral springs 116 abutting with the other ends 78 and 80 of rods 70. For example, with actuation canisters 82' having plunger rods 100 abutting with ends 78 of rods 70 and with actuation canisters 82 having plunger rods 100 abutting with ends 80 of rods 70, rod 70 will be biased to the left in FIG. 2 such that interfacing member 34 sandwiches disk pack 30 braking output shaft 14 by rotationally interrelating it to housing 26. Thus, with this arrangement, clutch/brake 10 according to the teachings of the present invention is in a spring set, braking condition. If fluid pressure is introduced through port 108 into fluid pressure chamber 112 of canisters 82 having plunger rod 100 abutting with ends 80 of rods 70, rods 70 are moved to the right in FIG. 2 and against the bias of springs 116' of canisters 82' thus moving interfacing member 34 to sandwich disk pack 20 and clutching in output shaft 14 by rotationally interrelating it to input shaft 12. When fluid pressure is released from fluid pressure chamber 112 of canisters 82, springs 116' of canisters 82' having plunger rod 100 abutting with ends 78 of rods 70 return rods 70 to its spring set braking condition due to the greater strength of springs 116' than springs 116. It should also be realized that fluid pressure may be introduced through port 108 into fluid pressure chamber 112 of canisters 82' having plunger rod 100 abutting with ends 78 of rods 70 to assist or boost springs 116' in moving rods 70 to their spring set, braking condition.

Figure 2:
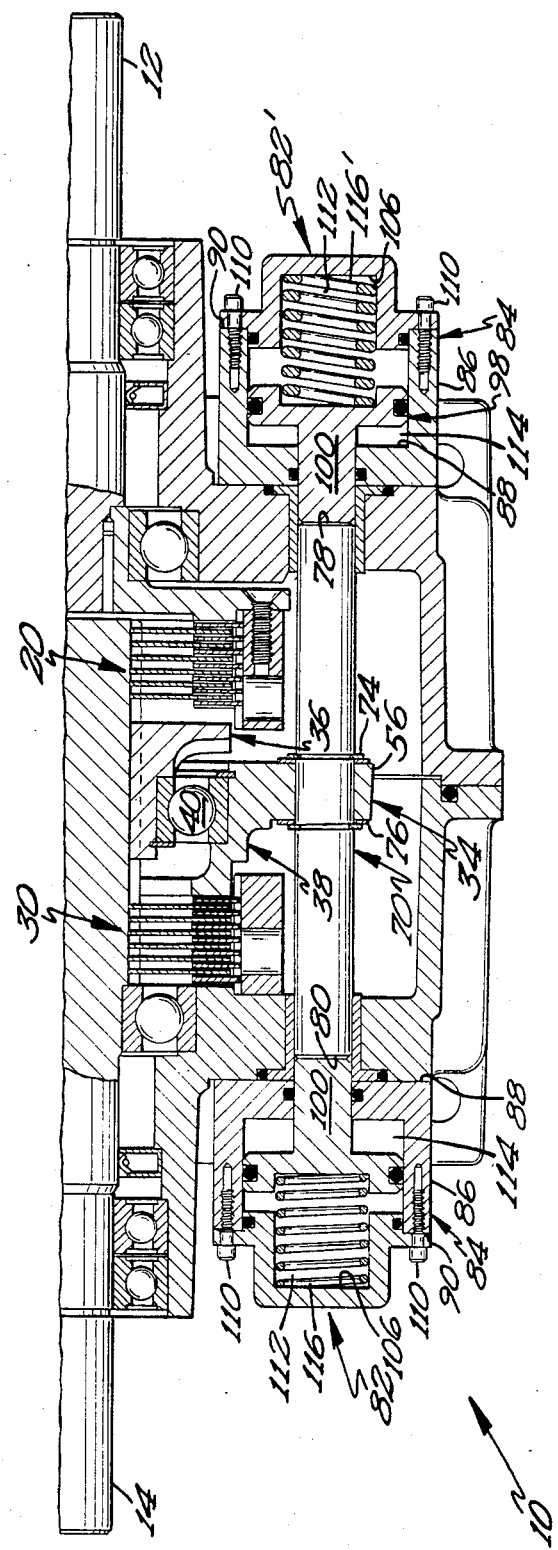
FIG. 2 shows a partial, cross-sectional view of an alternate form of the combination clutch/brake of FIG. 1.

It should then be realized that actuation canisters 82' having actuation springs 116' may be positioned to abut with ends 80 of rods 70 and with actuation canisters 82 having neutral springs 116 positioned to abut with ends 78 of rods 70 such that rods 70 are biased to the right in FIG. 2 such that interfacing member 34 sandwiches disk pack 20 clutching in output shaft 14. Thus, with this arrangement, clutch/brake 10 according to the teachings of the present invention is in a spring set, clutching condition. If fluid pressure is introduced through port 108 into fluid pressure chamber 112 of canisters 82 having plunger rod 100 abutting with ends 78 of rods 70, rods 70 are moved to the left in FIG. 2 and against the bias of springs 116' of canisters 82' thus moving interfacing member 34 to sandwich disk pack 30 and braking output shaft 14 by rotationally interrelating it to housing 26. When fluid pressure is released from fluid pressure chamber 112, springs 116' of canisters 82' having plunger rod 100 abutting with ends 80 of rods 70 return rods 70 to its spring set, clutching condition due to the greater strength of springs 116' than springs 116. It should also be realized that fluid pressure may be introduced through port 108 into fluid pressure chamber 112 of canisters 82' having plunger rod 100 abutting with ends 80 of rods 70 to assist or boost springs 116' in moving rods 70 to their spring set, clutching condition.

For purposes of illustration, an example of valve means useable to actuate clutch/brake 10 having canisters 82' will be described and it can be realized that other forms of actuation will be available. Specifically, the valve means may have at least three conditions where in a first condition, fluid from a source of fluid under pressure is directed to port 108 of canister 82 while any fluid pressure of chamber 112 is released through port 108 of canister 82' for moving actuating rod 70 against bias of springs 116', in a second condition any fluid is released from chamber 112 through port 108 of canister 82 allowing actuating rod 70 to move under the bias of springs 116', and in a third condition where fluid is also released from chamber 112 through port 108 of canister 82 but where fluid from a source of fluid under presure is directed to port 108 of canister 82' for assisting springs 116' in moving actuating rods 70. It can be appreciated that in the second condition, any fluid pressure of chamber 112 of canisters 82' may be released through port 108. Likewise, the valve means useable to actuate clutch/brake 10 having canisters 82 at both ends 78 and 80 of actuating rods 70 may have at least three conditions where in a first condition, fluid from a source of fluid under pressure is directed to port 108 of canister 82 moving end 78 of rods 70 while any fluid pressure of chamber 112 of canister 82 moving end 80 of rods 70 is released through port 108 for moving end 78 of actuating rod 70 axially inwardly, where in a second condition any fluid pressure of chambers 112 of both canisters 82 is released through ports 108 allowing springs 116 to center or axially balance actuating rods 70, and where in a third condition, fluid from a source of fluid under pressure is directed to port 108 of canister 82 moving end 80 of rods 70 while any fluid pressure of chamber 112 of canister 82 moving end 78 of rods 70 is released through port 108 for moving end 80 of actuating rod 70 axially inwardly.

It can then be realized that clutch/brake 10 according to the teachings of the present invention may be set up at the factory, at the warehouse or parts supply site, or at the field to be either in a spring set clutching condition, a spring set braking condition, or a neutral condition by the selection and arrangement of canisters 82 and 82' utilized. Further, canisters 82' which achieve a spring set condition are identical to canisters 82 which achieve a neutral set condition except for the substitution of a high compression, actuation-type spring 116' for a low compression neutral-type spring 116. It can then be appreciated that the modular construction of clutch/brake 10 according to the teachings of the present invention is particularly advantageous. First, it should be realized that the only constructional difference between clutch/brake 10 according to the teachings of the present invention in a spring set and a neutral actuation condition is the differences of springs 116 and 116'. Thus, it can be appreciated that since all parts are standardized, it is possible to manufacture all uniform parts, assemble the power capsule, i.e. housing 26 and all its internal components at the factory. Canister components can then be manufactured and assembled with springs 116 or 116' according to demand. Likewise, reduced inventory is possible because it is only necessary to keep sufficient inventory of actuation capsules 82 and 82' for attachment to assembled power capsules according to the actuation condition desired. Thus, manufacturing set up and inventory costs are substantially reduced according to the teachings of the present invention.

Furthermore, canisters 82 and 82' according to the teachings of the present invention are further advantageous. In the event that it is necessary to replace a canister such as the result of canister leakage, it is only necessary to remove the defective canister and replace it with a similar operative canister. Thus, substantial down-time is saved because it is not necessary to disassemble any other portions of clutch/brake 10. The defective canister may then be disposed of or may be rebuilt at the field, the factory, or other location without a substantial interruption of machine time.

Further, canisters 82 and 82' according to the teachings of the present invention may remove the risk to mechanics in the field of exploding springs 116 and 116' when disassembling canisters 82 and 82' as they may be simply tossed or may be factory rebuilt or rebuilt by trained personnel. Specifically, in disassembling prior clutch or brake units, often the springs would be released with great force especially in spring set conditions. Utilizing canisters 82 and 82' according to the teachings of the present invention, it is not necessary and in fact it is desirable not to disassemble the actuation portion of clutch/brake 10. Thus, accidental release of a compressed spring by persons in the field may be substantially reduced according to the teachings of the present invention.

Additionally, utilizing elongated, threaded bolts 110 as in the preferred form of canisters 82 and 82' according to the teachings of the present invention allow the compression of springs 116 and 116' to be substantially reduced before closure 104 would be released from cup-shaped member 84 and thus releasing springs 116 and 116' from canisters 82 and 82'. Thus, accidental release of a compressed spring is additionally reduced according to the teachings of the present invention.

Furthermore, it is believed that the construction of canisters 82 and 82' according to the teachings of the present invention are also particularly advantageous. Specifically, member 84, piston 98, and closure 104 may be easily and inexpensively cast and canisters 82 and 82' may be easily assembled according to the teachings of the present invention. Furthermore, canisters 82 and 82' according to the teachings of the present invention include only four components which are of a simple design and which incorporate the spring mounts, the sealing provisions, the reciprocal mounting, and like functional requirements.

Additionally, springs 116 and 116' bias rods 100 to extend outside of canisters 82 and 82' when detached from housing 26 of clutch/brake 10 according to the teachings of the present invention. Since ends 78 and 80 of rods 70 are located inwardly of bushings 72, it is only necessary to slide rods 100 into bushings 72 such that canisters 82 and 82' are properly centered and aligned on housing 26. Thus, the construction of canisters 82 and 82' and of actuating rod 70 and bushings 72 allows for the rapid assembly of clutch/brake 10 and without encountering the time consuming alignment problems of prior rotational control apparatus.

Further, the ability to assist or boost springs 116' in moving rods 70 to their spring engaged condition according to the teachings of the present invention is also advantageous. Under most conditions, springs 116' have sufficient force to spring set clutch/brake 10. However, under certain conditions such as in emergency situations, it may be desirable to electively exert greater force to faster rotatably relate output shaft 14 by the spring set. To utilize a spring having the force desired in such emergency-type situations may result in greater wear and failure of the actuation components. Canisters 82' according to the teachings of the present invention allow a smaller spring to be utilized for normal actuation situations but includes provisions for electively increasing the actuation force when the situation demands it and specifically utilizes fluid pressure to assist spring 116'.

Additionally, in a spring set environment, a sufficient force is then necessary to actuate clutch/brake 10 against this spring set. Thus, the greater the compression strength of the spring, the greater the force is needed to counter the spring set force. In many environments, it is undesirable to include pistons having large areas and/or the source of fluid is under relatively low pressure. Thus, it can be appreciated that clutch/brake 10 utilizing actuation canisters 82 and 82' according to the teachings of the present invention is further advantageous. Specifically, when it is desired to move rod 70 against the bias of its spring set, any fluid pressure in fluid pressure chamber 112 of canister 82' is released such that the fluid pressure introduced into chamber 112 of canister 82 needs only to overcome the normal actuation force of spring 116' and particularly does not need to overcome the greater, emergency-type, actuation force of spring 116' assisted by fluid pressure. Thus, the size of pistons 98 of canisters 82 may be relatively small and the fluid may be under relatively low pressure in clutch/brake 10 according to the teachings of the present invention while still allowing for elective, emergency-type, high force-type actuation.

Now that the basic teachings of the present invention have been explained, many extensions and variations will be obvious to one having ordinary skill in the art. For example, although the teachings of the present invention have been shown and described in its preferred form as a combination clutch/brake, it can be appreciated that these teachings may be applicable in other forms and types of rotational control apparatus. As a further example, clutch/brake 10 according to the teachings of the present invention is shown as a closed, oil film interface-type apparatus in its most preferred form, the teachings of the present invention may be applicable to other forms of clutch/brakes such as frictional or toothed interface types.

Also, in the most preferred form of the present invention, several independent and inventive aspects have been incorporated into a single rotational control apparatus which is believed to be particularly advantageous. However, a person skilled in the art may apply one or more of these inventive aspects in a rotational control apparatus of the same or different type according to the teachings of the present invention.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In an apparatus for providing rotational control between a first member, a second member, and a third member, with the apparatus including: means for rotatably mounting the first member, the second member, and the third member with respect to each other; a first rotational interfacing element secured to the second member; a second rotational interfacing element secured to the third member; a rotational interfacing member intermediate the first and second rotational interfacing elements; and means secured to the second member for reciprocating the rotational interfacing member for interfacing with the first and the second rotational interface elements, with the improvement comprising an improved rotational interfacing member comprising, in combination: a first pressure plate, with the first pressure plate being slideably mounted and rotatably related to the first member, with the first pressure plate having means for interfaceing with one of the first and the second rotational interfacing elements; a second pressure plate, with the second pressure plate having means for interfacing with the other of the first and the second rotational interfacing elements; means for interconnecting the first and second pressure plates for axial movement together and for allowing relative rotation with respect to each other, with the reciprocating means comprising an actuating rod reciprocally mounted in the second member, a radially extending ear formed on the second pressure plate of the rotational interfacing member, with the actuating rod extending axially through an aperture formed in the ear, means for preventing slideable movement of the ear with respect to the actuating rod for interconnecting the rotational interfacing member to the actuating rod for axial movement therewith, and means for reciprocating the actuating rod in the second member, with the axial movement of the sdcond pressure plate axially moving the first pressure plate in unison due to the interconnecting and rotation allowing means.

2. The apparatus of claim 1 wherein the first pressure plate is annular in shape having a generally L-shaped construction; wherein the first pressure plate comprises, in combination: an axially extending cylinder slideably mounted on and rotatably related to the first member; and a radially extending disk having the interfacing means.

3. The apparatus of claim 2 wherein the first pressure plate further comprises, in combination: fins formed on the radially extending disk opposite to the interfacing means and wherein when the interfacing means of the first pressure plate rotatably interfaces with one of the first and the second rotational interfacing elements, the fins of the first pressure plate mistifies lubricating oil in the apparatus for increasing the lubrication of the interconnecting and rotation allowing means.

4. The apparatus of claim 3 wherein the second pressure plate is annular in shape having a generally L-shaped construction, wherein the second pressure plate comprises, in combination: an axially extending cylinder having an inside surface and an outside surface; an annular element having a radially extending disk and an axially extending cylinder portion having an outside surface integrally connected to the inside surface of the axially extending cylinder, with the interfacing means included on the radially extending disk.

5. The apparatus of claim 1 wherein the second member is stationary and the apparatus acts as a brake when the rotational interfacing member interfaces with the first rotational interfacing element.

6. The apparatus of claim 1 wherein the movement preventing means comprises, in combination: retaining rings received on the actuating rods and on opposite sides of the ears of the rotational interfacing member.

7. The apparatus of claim 6 further comprising, in combination: abutment washers received on the actuating rods intermediate the ears of the rotational interfacing member and the retaining rings.

8. The apparatus of claim 1 wherein the actuating rods have a first end and a second end; and wherein the actuating rod reciprocating means comprises, in combination: a first actuation canister; a second actuation canister, with the canisters having a plunger rod for abutting with the end of the actuating rod; means for removeably securing the first actuation canister with the plunger rod abutting with the first end of the actuating rod; and means for removeably securing the second actuation canister with the plunger rod abutting with the second end of the actuating rod.

9. The apparatus of claim 8 wherein the actuation canisters comprise, in combination: a piston, with the plunger rod being attached to the piston; a chamber member for reciprocal receipt of the piston and for defining at least a first fluid pressure chamber for receiving fluid under pressure in a first axial direction; and means for biasing the piston in the first axial direction.

10. The apparatus of claim 9 wherein the piston biasing means comprises, in combination: a spring located in the first fluid pressure chamber.

11. The apparatus of claim 9 wherein the piston biasing means of the first and second actuation canisters comprises means for biasing the piston in the first axial direction with a force which is less than required to interface the rotational interfacing member with the first and second rotational interfacing elements, with the biasing means of the first and second actuation canisters located on opposite ends of the actuating rod balancing the rotational interfacing member in a neutral condition intermediate the first and second rotational interfacing elements.

12. The apparatus of claim 9 wherein the piston biasing means of the first actuation canister comprises means for biasing the piston in the first axial direction with a force which is less than required to interface the rotational interfacing member with the first and second rotational interfacing elements; wherein the piston biasing means of the second actuation canister comprises means for biasing the piston in the first axial direction with a force sufficient to interface the rotational interfacing member with one of the first and second rotational interfacing elements, with the biasing means of the second actuation canister biasing the actuating rod and the rotational interfacing member in a set interfacing condition with one of the first and second rotational interfacing elements in the absence of fluid pressure in the first fluid pressure chamber of the first actuation canister.

13. The apparatus of claim 12 further comprising, in combination: means for introducing fluid pressure in the first fluid pressure chamber of the second actuation canister for assisting the biasing means in moving the actuating rod into its set interfacing condition.

14. In an apparatus for providing rotational control between a first member and a second member, with the apparatus including: means for rotatably mounting the first member and the second member with respect to each other; a first rotational interfacing element; a rotational interfacing member; and means for reciprocating the rotational interfacing member for interfacing with the first rotational interface element, with the improvement comprising an improved reciprocating means comprising, in combination: at least one actuating rod reciprocally mounted in the second member, with the actuating rod having a first end and a second end; means for interconnecting the rotational interfacing member to the actuating rod for axial movement therewith; a first actuation canister; a second actuation canister, with the canisters having a plunger rod for abutting with the end of the actuating rod; means for removeably securing the first actuation canister with the plunger rod abutting with the first end of the actuating rod; and means for removeably securing the second actuation canister with the plunger rod abutting with the second end of the actuating rod.

15. The apparatus of claim 14 wherein the actuating rod interconnecting means comprises, in combination: a radially extending ear formed on the rotational interfacing member; with the actuating rod extending axially through an aperture formed in the ear; and means for preventing slideable movement of the ear with respect to the actuating rod.

16. The apparatus of claim 15 wherein the movement preventing means comprises, in combination: retaining rings received on the actuating rod and on opposite sides of the ear of the rotational interfacing member.

17. The apparatus of claim 14 wherein the apparatus provides rotational control between the first member, the second member, and a third member; wherein the rotatably mounting means comprises means for rotatably mounting the first member, the second member, and the third member with respect to each other; with the apparatus further including: a second rotational interfacing element secured to the third member, with the rotational interfacing member interfacing with the first and second rotational interface elements.

18. System for actuating a rotational control apparatus having at least a first rotational interfacing element and a rotational interfacing member, with the rotational interfacing member movable between at least a first, actuation condition and a second condition, with the rotational interfacing member being rotationally related to the rotational interfacing element in the first, actuation condition and with the rotational interfacing member being rotationally independant from the rotational interfacing element in the second condition, comprising, in combination: an actuating rod interconnected to the rotational interfacing member for axial movement therewith, with the actuating rod having a first end and a second end; means acting on the second end of the actuating rod for biasing the actuating rod for moving the rotational interfacing member into the first, actuation condition; a first fluid pressure chamber for receipt of fluid under pressure acting on the first end of the actuating rod for moving the actuating rod opposite to the biasing means for moving the rotational interfacing member into its second condition; means acting on the second end of the actuating rod for assisting the biasing means in moving the actuating rod for moving the rotational interfacing member from its second condition into its first, actuation condition comprising a second fluid pressure chamber acting on the second end of the actuating rod for receipt of fluid under pressure for moving the actuating rod for moving the rotational interfacing member into its first, actuation condition; and means for directing the introduction of fluid under pressure into the first pressure fluid chamber for moving the rotational interfacing member from its first, actuation condition against the bias of the biasing means into its second condition while releasing any fluid pressure from the second fluid pressure chamber, for releasing fluid pressure from the first fluid pressure chamber allowing the rotational interfacing member to move to its first, actuation condition under the bias of the biasing means, and for directing fluid under pressure into the second fluid pressure chamber for assisting the biasing means in moving the rotational interfacing member into the first, actuation condition while releasing any fluid pressure from the first fluid pressure chamber.

19. The system of claim 18 further comprising, in combination: a first actuation canister, with the first actuation canister comprising, in combination: a piston, a plunger rod attached to the piston, and a chamber member for reciprocal receipt of the piston, with the chamber member and the piston of the first actuation canister defining the first fluid pressure chamber; a second actuation canister, with the second actuation canister comprising, in combination: a piston, a plunger rod attached to the piston, and a chamber member for reciprocal receipt of the piston, with the chamber member and the piston of the second actuation canister defining the second fluid pressure chamber; means for removably securing the first actuation canister with the plunger rod abutting with the first end of the actuating rod; and means for removably securing the second actuation canister with the plunger rod abutting with the second end of the actuating rod.

20. The system of claim 19 wherein the biasing means comprises, in combination: a spring located in the second fluid pressure chamber.

* * * * *